US008411021B2

(12) United States Patent
Shiozaki

(10) Patent No.: US 8,411,021 B2
(45) Date of Patent: Apr. 2, 2013

(54) DISPLAY CONTROL APPARATUS AND DISPLAY CONTROL METHOD FOR ADJUSTING DISPLAY LUMINANCE ACCORDING TO AMBIENT BRIGHTNESS

(75) Inventor: Tomoyuki Shiozaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 476 days.

(21) Appl. No.: 12/476,613

(22) Filed: Jun. 2, 2009

(65) Prior Publication Data

US 2009/0303215 A1 Dec. 10, 2009

(30) Foreign Application Priority Data

Jun. 10, 2008 (JP) ................................ 2008-151819

(51) Int. Cl.
*G09G 3/36* (2006.01)
*G06F 3/033* (2006.01)

(52) U.S. Cl. ....................................... 345/102; 345/158

(58) Field of Classification Search .................. 345/102, 345/158

See application file for complete search history.

(56) References Cited

U.S. PATENT DOCUMENTS

| | | | | |
|---|---|---|---|---|
| 6,393,215 | B1 * | 5/2002 | Washisu | 348/E5.046 |
| 6,483,245 | B1 * | 11/2002 | Weindorf et al. | 315/149 |
| 7,498,951 | B2 * | 3/2009 | Wardimon | 345/102 |
| 7,504,612 | B2 * | 3/2009 | Yu et al. | 345/207 |
| 7,826,874 | B2 * | 11/2010 | Fyke | 455/127.5 |
| 2006/0052109 | A1 * | 3/2006 | Ashman et al. | 455/440 |
| 2006/0197735 | A1 * | 9/2006 | Vuong et al. | 345/102 |
| 2007/0075965 | A1 * | 4/2007 | Huppi et al. | 345/156 |
| 2007/0195074 | A1 * | 8/2007 | Gelissen | 345/204 |
| 2008/0008313 | A1 * | 1/2008 | Fyke | 379/433.01 |

FOREIGN PATENT DOCUMENTS

| | | | |
|---|---|---|---|
| JP | 5-241512 | A | 9/1993 |
| JP | 2000-111872 | A | 4/2000 |
| JP | 3986278 | B2 | 10/2007 |
| JP | 2008-158104 | A | 7/2008 |

* cited by examiner

*Primary Examiner* — Adam J Snyder

(74) *Attorney, Agent, or Firm* — Canon USA Inc. IP Division

(57) ABSTRACT

A display control apparatus includes an external light detection unit configured to detect ambient brightness of a display apparatus, a variation detection unit configured to detect a variation of orientation of the display apparatus, and a control unit configured to adjust display luminance of the display apparatus according to the ambient brightness detected by the external light detection unit and the variation detected by the variation detection unit.

4 Claims, 11 Drawing Sheets

DISPLAY CONTROL APPARATUS AND DISPLAY CONTROL METHOD FOR ADJUSTING DISPLAY LUMINANCE ACCORDING TO AMBIENT BRIGHTNESS

BACKGROUND OF THE INVENTION

1. Field of the Invention

The present invention relates to a technique to adjust the display luminance of a screen of a display apparatus according to ambient brightness.

2. Description of the Related Art

Many portable display apparatuses, such as a mobile phone, a digital camera, and a music player, are currently provided with a display that displays a menu screen and a captured image. The visibility of these portable display apparatuses significantly depends on ambient brightness. For example, when the display luminance of a display apparatus is kept constant, at an outdoor bright location, display brightness is insufficient and this may make the display difficult to view, and at an indoor dark location, display is too bright and this may make the display difficult to view. Accordingly, the ability to adjust the display luminance of a display apparatus in response to ambient brightness is preferable.

Japanese Patent Application Laid-Open No. 5-241512 discusses a technique to detect ambient brightness with a photometry sensor provided around a display apparatus and to adjust display luminance according to the detected value.

However, ambient illuminance significantly varies with the orientation of a display apparatus. Thus, in the technique discussed in Japanese Patent Application Laid-Open No. 5-241512, for example, when a portable display apparatus is moved while displaying an image thereon, display luminance may change frequently with a change in ambient illuminance.

Japanese Patent No. 03986278 discusses a technique to adjust the rate of change in display luminance of a display apparatus based on the size of a deviation between the current display luminance of the display apparatus and a desired display luminance to be determined by ambient illuminance. When the deviation between the desired display luminance and the current display luminance is large, a long period of time is required until the display luminance changes. Accordingly, a sudden change in display luminance due to a change in ambient illuminance can be prevented.

However, according to the technique discussed in Japanese Patent No. 03986278, the larger a deviation between the desired display luminance and the current display luminance, the longer a period of time is required until an appropriate display luminance is provided relative to ambient illuminance. Thus, when a user intends to view the display immediately after performing a certain operation, for example, to confirm a captured image with a digital camera, an appropriate display luminance may not be provided according to the conventional technique, so that visibility may deteriorate.

SUMMARY OF THE INVENTION

According to an aspect of the present invention, a display control apparatus includes an external light detection unit configured to detect ambient brightness of a display apparatus, a variation detection unit configured to detect a variation of orientation of the display apparatus, and a control unit configured to adjust display luminance of the display apparatus according to the ambient brightness detected by the external light detection unit and the variation detected by the variation detection unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

Figure 1:
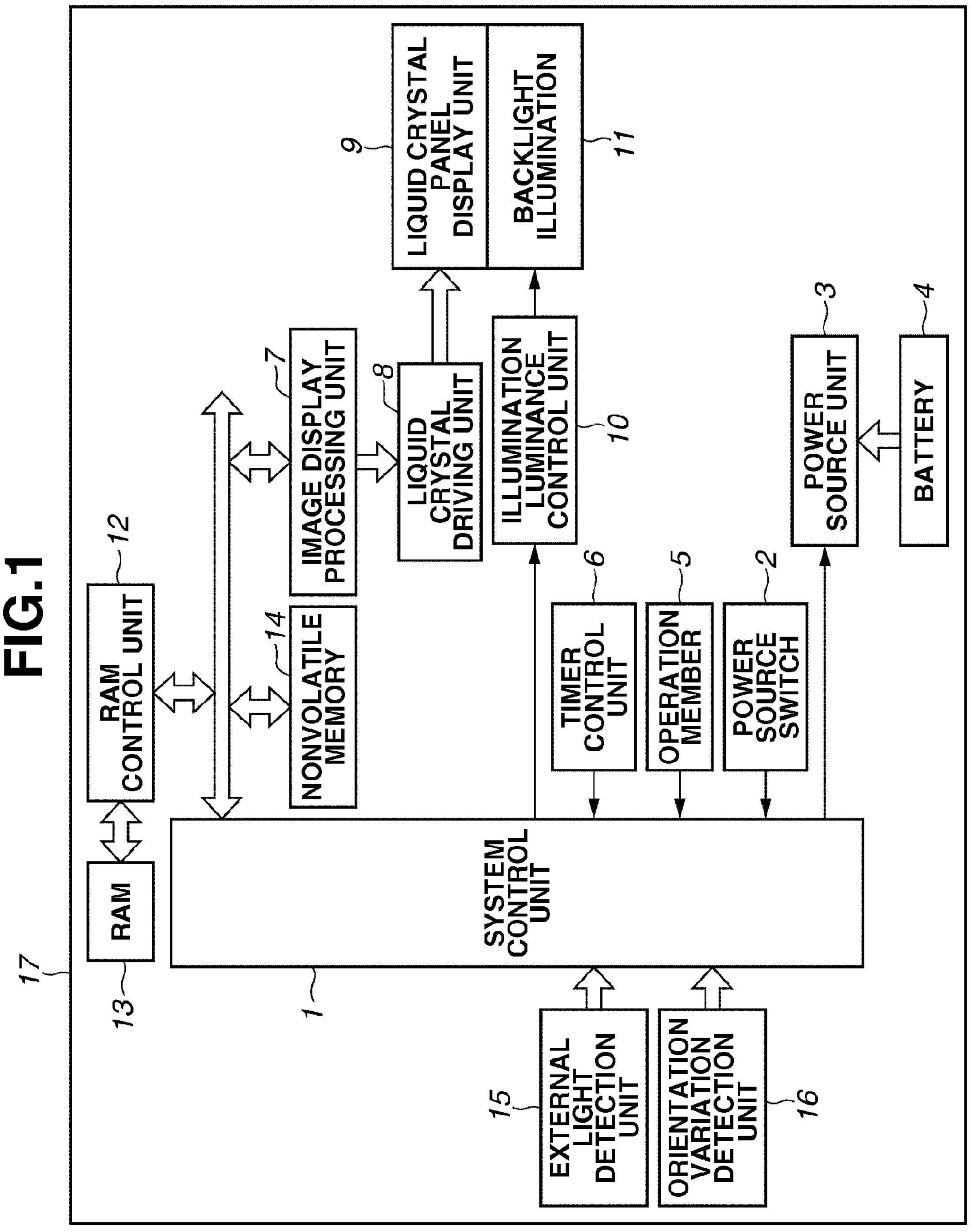
FIG. 1 is a block diagram illustrating a configuration of a portable display apparatus according to an exemplary embodiment of the present invention.

FIG. 1 is a block diagram illustrating a configuration of a display apparatus 17 according to an exemplary embodiment of the present invention. The display apparatus 17 includes an image-displayable digital camera, mobile phone device, or the like. However, the present invention is not limited to these products and applicable to various products with a display function.

A system control unit 1 includes a central processing unit, which controls the display apparatus 17. A power source switch 2 can switch power on/off of the display apparatus 17. A power source unit 3 generates various power sources for supplying power to the display apparatus 17. A battery 4 is connected to the power source unit 3. The display apparatus 17 is of portable type. A primary battery such as an alkaline battery, a nickel-hydrogen battery or the like can be used. An operation member 5 includes a mode setting dial for switching the operation state of the display apparatus 17 and a menu button for displaying a menu which can select a detail setting. Further, the operation member 5 includes a selection operation key for executing selection or cancel of each item in a screen when a menu is displayed, a determination button, and a cancel button. Furthermore, the operation member 5 includes a sleep button for forcedly shifting to a sleep mode.

A timer control unit 6 includes a clock function, a calendar function, a timer counter function, and an alarm function. The timer control unit 6 is used for system management such as a shift time to a sleep mode and alarm notification. In the present exemplary embodiment, measurement of a time period is executed by the timer control unit 6.

An image display processing unit 7 includes a calculation processing unit configured to convert display data stored in a memory area for image display allocated to a random access memory (RAM) 13 into a data format displayable on a liquid crystal panel display unit 9. The imaged is play processing unit 7 outputs horizontal/vertical synchronizing signals and dot clock signals. Further, the image display processing unit 7 includes a contrast change function for executing a gain correction to a luminance signal of display data. Furthermore, the image display processing unit 7 includes a color gradation change function for executing quantization processing after error diffusion calculation processing and dither calculation processing to pixels of display data.

A liquid crystal driving unit 8 generates and supplies red, green, and blue (RGB) independent output signals and a driving timing signal for driving the liquid crystal panel display unit 9 from data input from the image display processing unit 7. Further, the liquid crystal driving unit 8 allows matrix transformation, picture correction, brightness correction, contrast correction, gamma correction, flip horizontal and flip vertical display control, and display position adjustment to display data from the image display processing unit 7 by setting communication with the system control unit 1.

The liquid crystal panel display unit 9 displays an image using a thin film transistor active matrix driving method. An illumination method for the liquid crystal panel display unit 9 includes a transparent method, a semitransparent method, or the like.

An illumination luminance control unit 10 can adjust illumination luminance of a backlight illumination 11 in incremental steps. The illumination luminance control unit 10 can linearly change illumination luminance by limiting an electric current flowing from the system control unit 1 to an emitter of the backlight illumination 11 with voltage driving, pulse width modulation (PWM) driving, or the like.

The backlight illumination 11 is fixed on the back surface of the liquid crystal panel display unit 9 and is configured to emit light from the back surface with an illumination unit, such as a light emitting diode (LED) or a fluorescent tube. Since a light transmittance is changed according to a voltage applied to each pixel of the liquid crystal panel display unit 9, a color can be reproduced with light from the backlight illumination 11 passing through an RGB color filter.

A RAM control unit 12 executes data transfer control between each of the system control unit 1 and the image display processing unit 7 and the RAM 13. The RAM control unit 12 includes a direct memory access control function to allow high-speed transfer and can directly transfer display data to the image display processing unit 7 without using the system control unit 1.

The RAM 13 is a high-speed volatile memory and includes a program stack area, a status storage area, a calculating area, a working area, and an image display data area for the system control unit 1. In the status storage area, an orientation variation excess determination flag is provided.

In an electrically erasable and recordable nonvolatile memory 14, such as a flash memory, menu setting information and a control program for the display apparatus 17 are stored. Further, in the nonvolatile memory 14, data necessary to configure display image data, such as character font data, icon data, menu items, menu backgrounds, and color palette information is stored.

An external light detection unit 15 includes a light receiving element, such as a photodiode or a phototransistor, and a light receiving circuit. A plurality of external light detection units 15 is installed in the vicinity of the liquid crystal panel display unit 9. A plurality of detected values is averaged. Thus, illuminance around the liquid crystal panel display unit 9 can be more accurately detected. Further, among the external light detection units 15, when a detected value is significantly changed with one external light detection unit hidden by a finger or the like, the detected value by the external light detection unit 15 is discarded, thereby preventing display luminance from being significantly changed.

An orientation variation detection unit 16 includes a sensor capable of detecting an orientation variation per unit time, such as an angular acceleration sensor, an acceleration sensor, or a gyro sensor, and a detection circuit.

Figure 2:
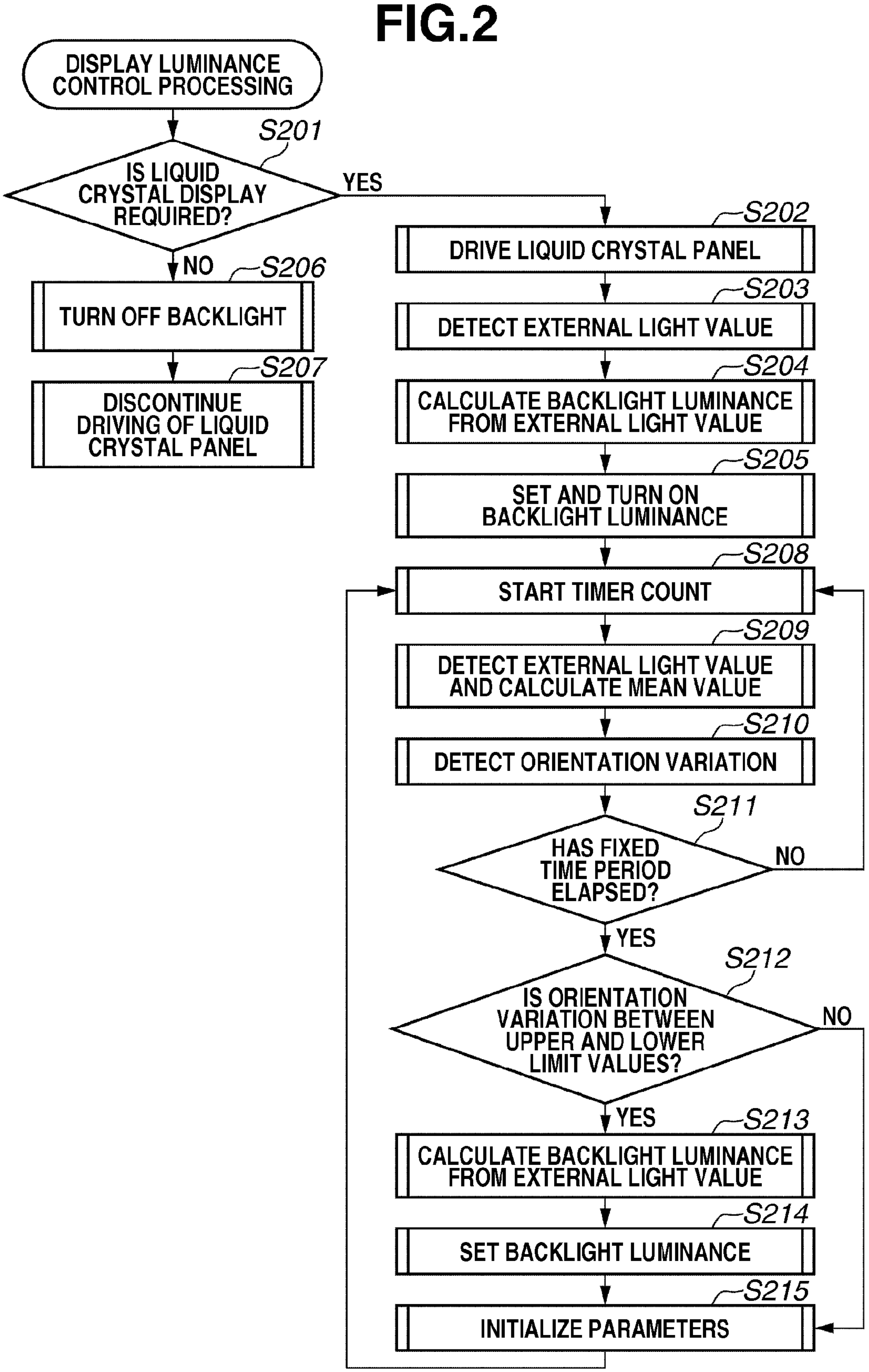
FIG. 2 is a flowchart illustrating automatic light control processing performed by a display unit according to a first exemplary embodiment of the present invention.

FIG. 2 is a flowchart illustrating display luminance control processing to be executed in the present exemplary embodiment.

In step S201, the system control unit 1 determines whether the backlight illumination 11 is required for a display request in a turn-on mode or a display request in a turn-off mode by referring to a state of the operation member 5 when moving to the flow or a state of sleep mode of the timer control unit 6. If the backlight illumination 11 is required for a display request in the turn-on mode (YES in step S201), the processing proceeds to step S202. Otherwise (NO in step S201), the processing proceeds to step S206. Display determination in step S201 is continuously monitored during a subsequent routine and has high priority as interrupt processing even when other processing is executed.

In step S206, the system control unit 1 executes setting to turn off the backlight illumination 11 to the illumination luminance control unit 10 and causes the backlight illumination 11 to be turned off.

In step S207, the system control unit 1 transmits a driving discontinuation command for the liquid crystal panel display unit 9 to the liquid crystal driving unit 8. The liquid crystal driving unit 8 receives the command and then immediately discontinues outputting a driving signal.

In step S202, the system control unit 1 transmits a driving start command for the liquid crystal panel display unit 9 to the liquid crystal driving unit 8. Display data is generated based on display data provided in the nonvolatile memory 14 in advance and transferred to the image display data area of the RAM 13. Then, the system control unit 1 executes register setting in the image display processing unit 7 and transmits a command to the liquid crystal driving unit 8 to start outputting a display data signal. After the liquid crystal driving unit 8 receives the command and a predetermined output stable period has elapsed, the liquid crystal driving unit 8 starts outputting a driving signal to the liquid crystal panel display unit 9.

In step S203, the external light detection unit 15 detects an external light value. In step S204, the system control unit 1 calculates a backlight luminance value suitable for an external light value by reference to an external light detected value calculated in step S203. In the present exemplary embodiment, the system control unit 1 includes a function of obtaining a backlight luminance value in advance and executes calculation using this function by providing an external light value as an input value, thereby calculating a luminance level of a suitable backlight. This function is obtained, for example, by an experiment accompanied by a visibility test of an operator with the display apparatus 17 remaining still. In the present exemplary embodiment, the system control unit 1 stores a function. However, the system control unit 1 can be configured to store a table including associated external light values and luminance value levels and to obtain a luminance level of a backlight by reference to this table.

Processing in steps S203 and S204 is executed during an output stable period of the liquid crystal driving unit 8. In step S205, the system control unit 1 executes setting of luminance calculated in step S204 to the illumination luminance control unit 10 and turns on the backlight illumination 11. Thus, display is executed on the liquid crystal panel display unit 9.

In step S208, the system control unit 1 causes the timer control unit 6 to start a timer count. The timer control unit 6 measures a predetermined fixed time period. In step S209, the external light detection unit 15 detects an external light value. The detection cycle of the external light detection unit 15 is set shorter than the fixed time period to be measured by the timer count. An external light detected value is transmitted to the calculation area of the RAM 13 by the system control unit 1 and a mean value of detected values during the fixed time period is calculated. In step S210, the orientation variation detection unit 16 detects an orientation variation of the display apparatus 17. The detection cycle of the orientation variation detection unit 16 is set shorter than the fixed time period to be measured by the timer count. When the orientation variation exceeds a predetermined upper limit value or lower limit value during the fixed time period, in other words, when the orientation variation of a display apparatus is large at a predetermined time interval, the system control unit 1 sets an orientation variation excess determination flag in the status area of the RAM 13.

In step S211, the system control unit 1 determines whether the fixed time period has elapsed in the timer control unit 6. If the fixed time period has elapsed (YES in step S211), the processing proceeds to step S212. If the fixed time period has not elapsed (NO in step S211), the processing proceeds to step S208. In step S212, the system control unit 1 determines whether the orientation variation excess determination flag is set in step S210. If the orientation variation excess determination flag is set, the orientation variation exceeds the predetermined upper limit value or lower limit value during the fixed time period (NO in step S212), the processing proceeds to step S215. If the orientation variation excess determination flag is not set, the orientation variation does not exceed the predetermined upper limit value or lower limit value during the fixed time period (YES in step S212), the processing proceeds to step S213.

In step S213, the system control unit 1 refers to a mean value of external light detected values during the fixed time period calculated in step S209 and calculates a suitable backlight luminance value for an external light value. In step S214, the system control unit 1 executes setting of the backlight luminance value calculated in step S213 and performs light control processing on the backlight illumination 11. In step S215, the system control unit 1 initializes parameters including the timer count value, the orientation variation excess determination flag, and the mean value of external light detected values.

Figure 3:
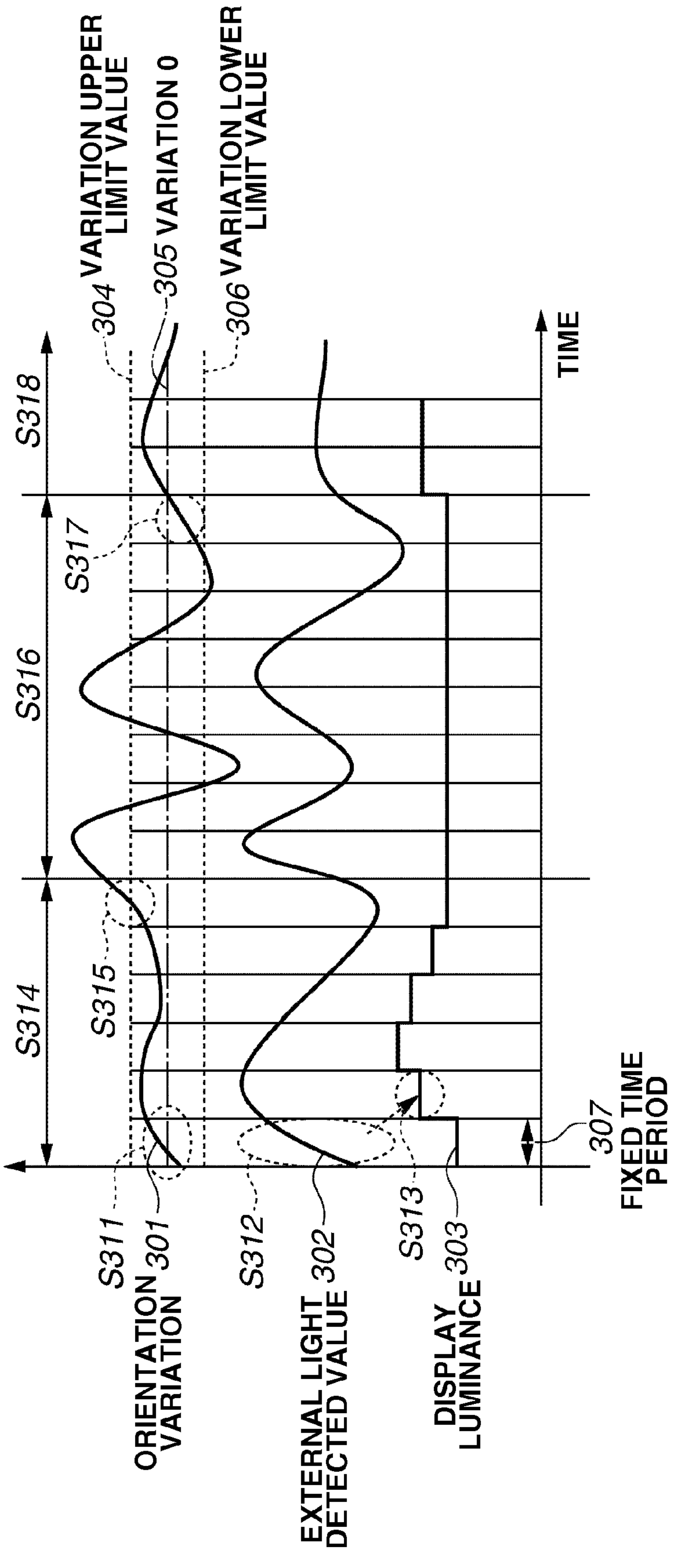
FIG. 3 is a schematic diagram illustrating a relationship among an orientation variation, an external light detected value, and a change in display luminance of a display apparatus according to the first exemplary embodiment.

FIG. 3 illustrates an example of a relationship among an orientation variation, an external light detected value, and a change in display luminance. Line 301 represents a detected value detected by the orientation variation detection unit 16. Line 302 represents a detected value detected by the external light detection unit 15. Line 303 represents display luminance of the liquid crystal panel display unit 9 when an image is displayed.

Line 304 represents an upper limit value of an orientation variation detected value to be detected by the orientation variation detection unit 16. Line 305 represents a value 0 of an orientation variation detected value to be detected by the orientation variation detection unit 16. Line 306 represents a lower limit value of an orientation variation detected value to be detected by the orientation variation detection unit 16. Line 307 represents a fixed time period to be measured by the timer control unit 6.

With respect to the flow of a change in display luminance, an example will be described below. In step S311, since an orientation variation does not exceed the upper limit value 304 and the lower limit value 306 during the fixed time period 307, then in step S212 illustrated in FIG. 2, it is determined that the orientation variation does not exceed the predetermined upper limit value or lower limit value during the fixed time period.

In step S312, a mean value of external light detected values during the fixed time period 307 is calculated. In step S313, a determination result in step S311 is received and a mean value of external light detected values in step S312 is referred to. Then, according to the processing in steps S213 and S214 illustrated in FIG. 2, the system control unit 1 calculates a suitable backlight luminance value for an external light value and subjects the backlight illumination 11 to light control. Subsequently, until the orientation variation exceeds the upper limit value 304 in step S315, automatic light control of the backlight illumination 11 is executed according to an external light detected value in a region in step S314.

In step S315, since the orientation variation exceeds the upper limit value 304 during the fixed time period 307, then in step S212 illustrated in FIG. 2, it is determined that the orientation variation exceeds the predetermined upper limit value during the fixed time period, and the processing proceeds to step S215. Subsequently, in a region in step S316, it is determined that the orientation variation exceeds the predetermined upper limit value or lower limit value during the fixed time period in step S212 illustrated in FIG. 2. Thus, the processing does not pass through steps S213 and S214, and proceeds to step S215. Accordingly, the backlight illumination 11 is not subjected to automatic light control and display luminance is kept constant.

In step S317, it is determined that the orientation variation does not exceed the predetermined upper limit value or lower limit value during the fixed time period in step S212 illustrated in FIG. 2. Subsequently, the processing again passes through steps S213 and S214 in a region in step S318. Thus, automatic light control of the backlight illumination 11 is executed according to an external light detected value.

As described above, according to the first exemplary embodiment, when the orientation variation of a display apparatus is large at a predetermined time interval, in other words, when the orientation variation speed of the display apparatus is high, the control unit performs control not to execute automatic light control. Accordingly, a disadvantage of changing brightness of a display screen every time the orientation of the display apparatus is changed can be resolved. When the display apparatus is stationary and the screen is watched, the screen is continuously adjusted to suitably display luminance according to a change in external light. Thus, visibility can be improved. As a result, the display control apparatus is capable of improving visibility of a display apparatus by adjusting display luminance according to a variation of orientation of the display apparatus.

A second exemplary embodiment of the present invention is configured to turn off the backlight illumination 11 instead of inhibiting automatic light control when it is determined that the orientation variation exceeds the predetermined upper limit value or lower limit value during the fixed time period. The configuration of the second exemplary embodiment is similar to that in FIG. 1 in the first exemplary embodiment.

Figure 4:
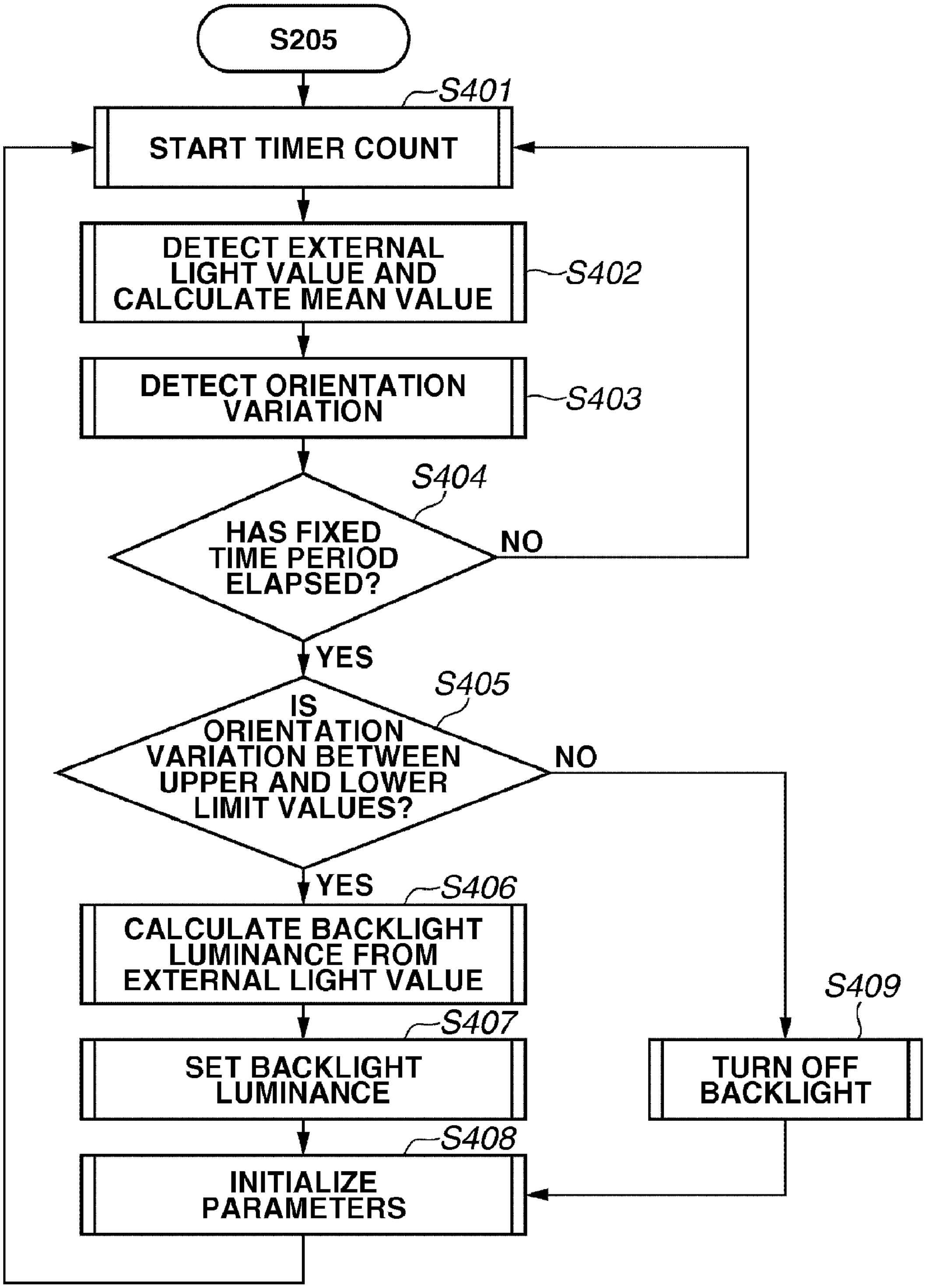
FIG. 4 is a flowchart illustrating automatic light control processing performed by a display unit according to a second exemplary embodiment of the present invention.

FIG. 4 is a flowchart illustrating processing executed in the present exemplary embodiment. Since processing prior to step S401 in FIG. 4 is similar to that before step S205 in FIG. 2, descriptions thereof are not repeated.

In step S401, the system control unit 1 causes the timer control unit 6 to start a timer count. The timer control unit 6 measures a predetermined fixed time period. In step S402, the external light detection unit 15 detects an external light value. The detection cycle of the external light detection unit 15 is set shorter than the fixed time period to be measured by the timer count. An external light detected value is transmitted to the calculation area of the RAM 13 by the system control unit 1 and a mean value of detected values during the fixed time period is calculated. In step S403, the orientation variation detection unit 16 detects an orientation variation of the display apparatus 17. The detection cycle of the orientation variation detection unit 16 is set shorter than the fixed time period to be measured by the timer count. When the orientation variation exceeds a predetermined upper limit value and lower limit value during the fixed time period, the system control unit 1 sets an orientation variation excess determination flag in the status area of the RAM 13.

In step S404, the system control unit 1 determines whether the fixed time period has elapsed in the timer control unit 6. If the fixed time period has elapsed (YES in step S404), the processing proceeds to step S405. If the fixed time period has not elapsed (NO in step S404), the processing proceeds to step S401. In step S405, the system control unit 1 determines whether the orientation variation excess determination flag is set in step S403. If the orientation variation excess determination flag is set, the orientation variation exceeds the predetermined upper limit value or lower limit value during the fixed time period (NO in step S405), the processing proceeds to step S409. If the orientation variation excess determination flag is not set, the orientation variation does not exceed the predetermined upper limit value or lower limit value during the fixed time period (YES in step S405), the processing proceeds to step S406.

In step S406, the system control unit 1 refers to a mean value of external light detected values during the fixed time period calculated in step S403 and calculates a suitable backlight luminance value for an external light value. In step S407, the system control unit 1 executes setting of the backlight luminance value calculated in step S406 and performs light control processing on the backlight illumination 11. In step S408, the system control unit 1 initializes parameters including the timer count value, the orientation variation excess determination flag, and the mean value of external light detected values. In step S409, the system control unit 1 executes setting to turn off the backlight illumination 11 to the illumination luminance control unit 10 and causes the backlight illumination 11 to be turned off.

Figure 5:
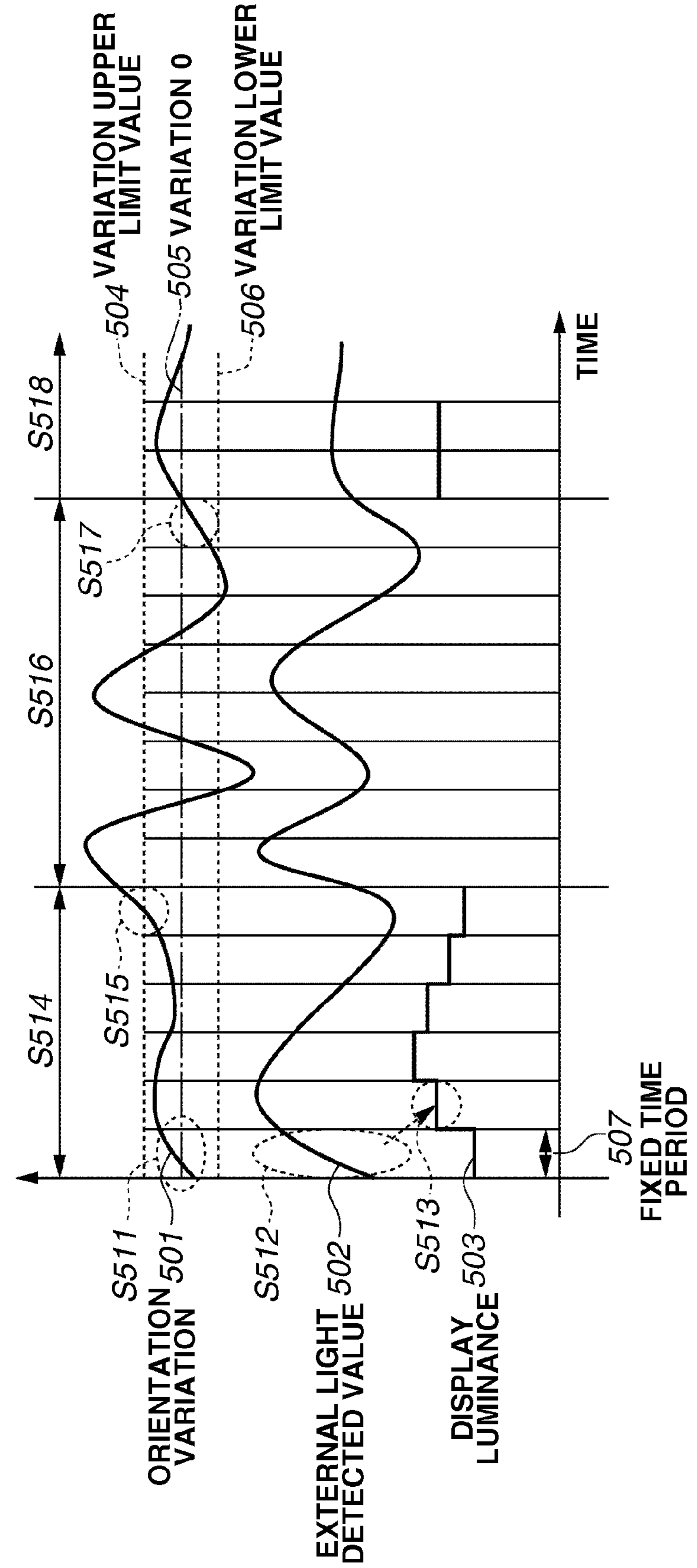
FIG. 5 is a schematic diagram illustrating a relationship among an orientation variation, an external light detected value, and a change in display luminance of a display apparatus according to the second exemplary embodiment.

FIG. 5 illustrates an example of a relationship among an orientation variation, an external light detected value, and a change in display luminance. Line 501 represents a detected value detected by the orientation variation detection unit 16. Line 502 represents a detected value detected by the external light detection unit 15. Line 503 represents display luminance of the liquid crystal panel display unit 9 when the image is displayed.

Line 504 represents an upper limit value of an orientation variation detected value to be detected by the orientation variation detection unit 16. Line 505 represents a value 0 of an orientation variation detected value to be detected by the orientation variation detection unit 16. Line 506 represents a lower limit value of an orientation variation detected value to be detected by the orientation variation detection unit 16. Line 507 represents a fixed time period to be measured in the timer control unit 6.

With respect to the flow of a change in display luminance, an example will be described below. In step S511, since an orientation variation does not exceed the upper limit value 504 and the lower limit value 506 during the fixed time period 507, then in step S405 illustrated in FIG. 4, it is determined that the orientation variation does not exceed the predetermined upper limit value or lower limit value during the fixed time period.

In step S512, a mean value of external light detected values during the fixed time period 507 is calculated. In step S513, a determination result in step S511 is received and a mean value of external light detected values in step S512 is referred to. Then, in steps S406 and S407 illustrated in FIG. 4, the system control unit 1 calculates a suitable backlight luminance value for an external light value and subjects the backlight illumination 11 to light control. Subsequently, until the orientation variation exceeds the upper limit value 504 in step S515, automatic light control of the backlight illumination 11 is executed according to an external light detected value in a region in step S514.

In step S515, since the orientation variation exceeds the upper limit value 504 during the fixed time period 507, then in step S405 illustrated in FIG. 4, it is determined that the orientation variation exceeds the predetermined upper limit value during the fixed time period. The processing proceeds to step S409 in FIG. 4.

Subsequently, in a region in step S516, it is determined that the orientation variation exceeds the predetermined upper limit value or lower limit value during the fixed time period in step S405 illustrated in FIG. 4. The processing does not pass through steps S406 and S407, and proceeds to step S409. In step S409, the system control unit 1 turns off the backlight illumination 11.

In step S517, it is determined that the orientation variation does not exceed the predetermined upper limit value or lower limit value during the fixed time period in step S405 illustrated in FIG. 4. Subsequently, the processing again passes through steps S406 and S407 in a region in step S518. Thus, automatic light control of the backlight illumination 11 is executed according to an external light detected value.

As described above, according to the second exemplary embodiment, when the orientation variation of a display apparatus is large, the control unit performs control to turn off the backlight illumination 11. Thus, a disadvantage of changing brightness of a display screen every time the orientation of the display apparatus is changed can be resolved. Further, electric power consumption can be reduced compared with the first exemplary embodiment. Similar to the first exemplary embodiment, when the display apparatus is made stationary and the screen is watched, the screen is continuously adjusted to suitably display luminance according to a change in external light. Thus, visibility can be improved.

Figure 6:
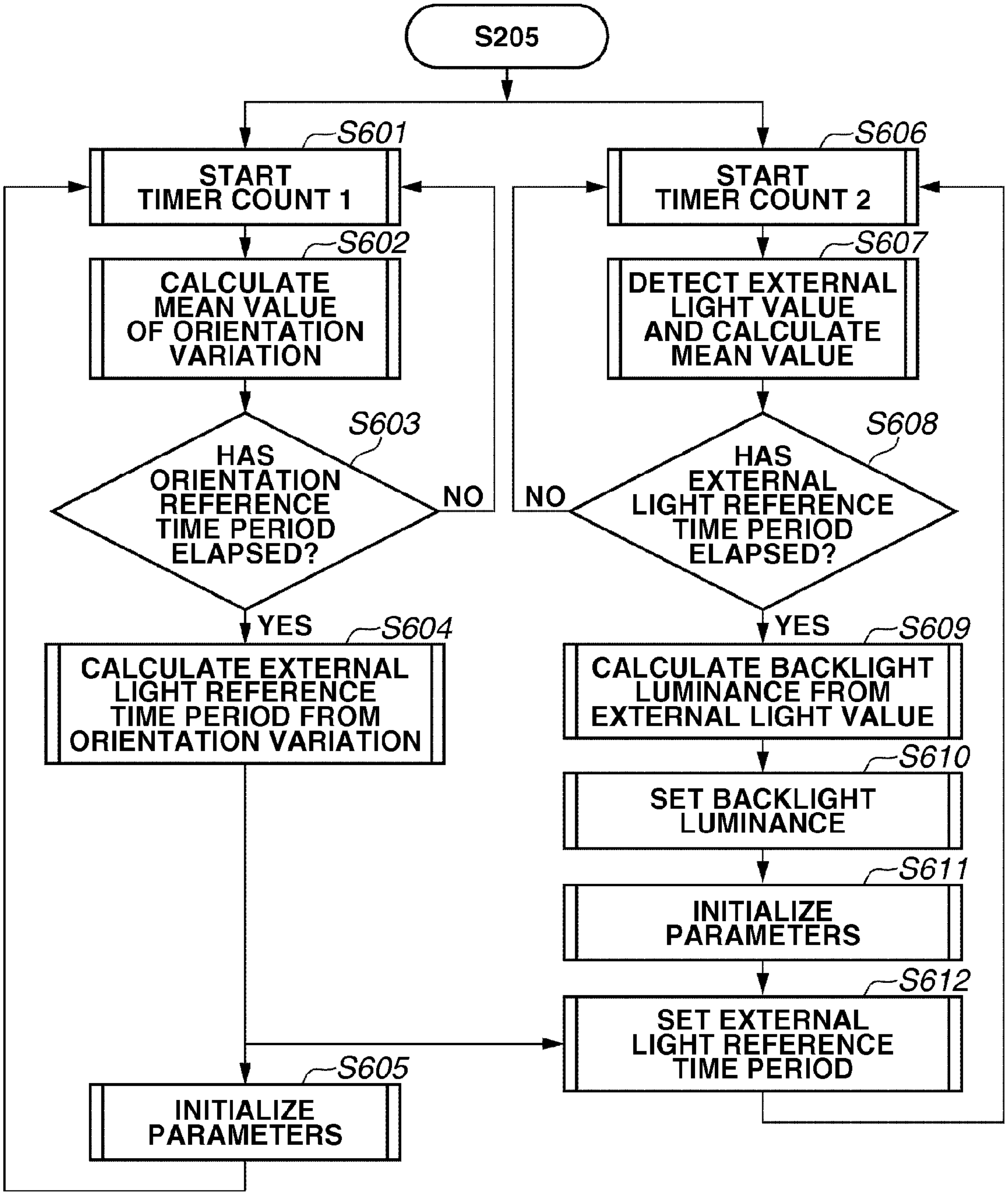
FIG. 6 is a flowchart illustrating automatic light control processing performed by a display unit according to a third exemplary embodiment of the present invention.

A third exemplary embodiment of the present invention will be described. The configuration of the third exemplary embodiment is similar to that in FIG. 1 in the first exemplary embodiment. FIG. 6 is a flowchart illustrating processing executed in the present exemplary embodiment. Since processing prior to step S601 in FIG. 6 is similar to processing before step S205 in FIG. 2, descriptions thereof are not repeated.

In step S601, the system control unit 1 causes the timer control unit 6 to start timer count 1. The timer control unit 6 measures an orientation variation reference time period. The orientation variation reference time period is a predetermined fixed value. In step S602, the orientation variation detection unit 16 detects an orientation variation of the display apparatus 17. The detection cycle of the orientation variation detection unit 16 is set shorter than the orientation variation reference time period. Further, the orientation variation detected value is an absolute value. The system control unit 1 transmits the orientation variation detected value to the calculation area of the RAM 13 and calculates a mean value of orientation variation detected values during the orientation variation reference time period. In step S603, the system control unit 1 determines whether the orientation variation reference time period has elapsed in the timer control unit 6. If the orientation variation reference time period has elapsed (YES in step S603), the processing proceeds to step S604. If the orientation variation reference time period has not elapsed (NO in step S603), the processing proceeds to step S601.

In step S604, the system control unit 1 causes the timer control unit 6 to calculate an external light reference time period from a mean value of orientation variation detected values during the orientation variation reference time period calculated in step S602. The larger the orientation variation becomes, the longer the external light reference time period is set. In step S605, the system control unit 1 initializes parameters including a count value of the timer counter 1 and the mean value of orientation variation detected values.

In step S606, the system control unit 1 causes the timer control unit 6 to start timer count 2. The timer control unit 6 measures a reference time period of an external light value. The reference time period of an external light value is changed according to a result in step S604. In step S607, the external light detection unit 15 detects an external light value. The detection cycle of the external light detection unit 15 is set shorter than the reference time period of an external light value. The system control unit 1 transmits an external light detected value 2 to the calculation area of the RAM 13 and calculates a mean value of external light detected values 2 during the external light value reference time period. In step S608, the system control unit 1 determines whether the external light value reference time period has elapsed in the timer control unit 6. If the external light value reference time period has elapsed (YES in step 608), the processing proceeds to step S609. If the external light value reference time period has not elapsed (NO in step S608), the processing proceeds to step S606.

In step S609, the system control unit 1 refers to a mean value of external light detected values during the external light value reference time period calculated in step S607 and calculates a suitable backlight luminance value for an external light value. In step S610, the system control unit 1 executes setting of the backlight luminance value calculated in step S609 and performs light control processing on the backlight illumination 11. In step S611, the system control unit 1 initializes parameters including a count value of the timer count 2 and the mean value of external light detected values. In step S612, the system control unit 1 changes the external light reference time period to be measured in the timer control unit 6 into a value calculated in step S604.

Figure 7:
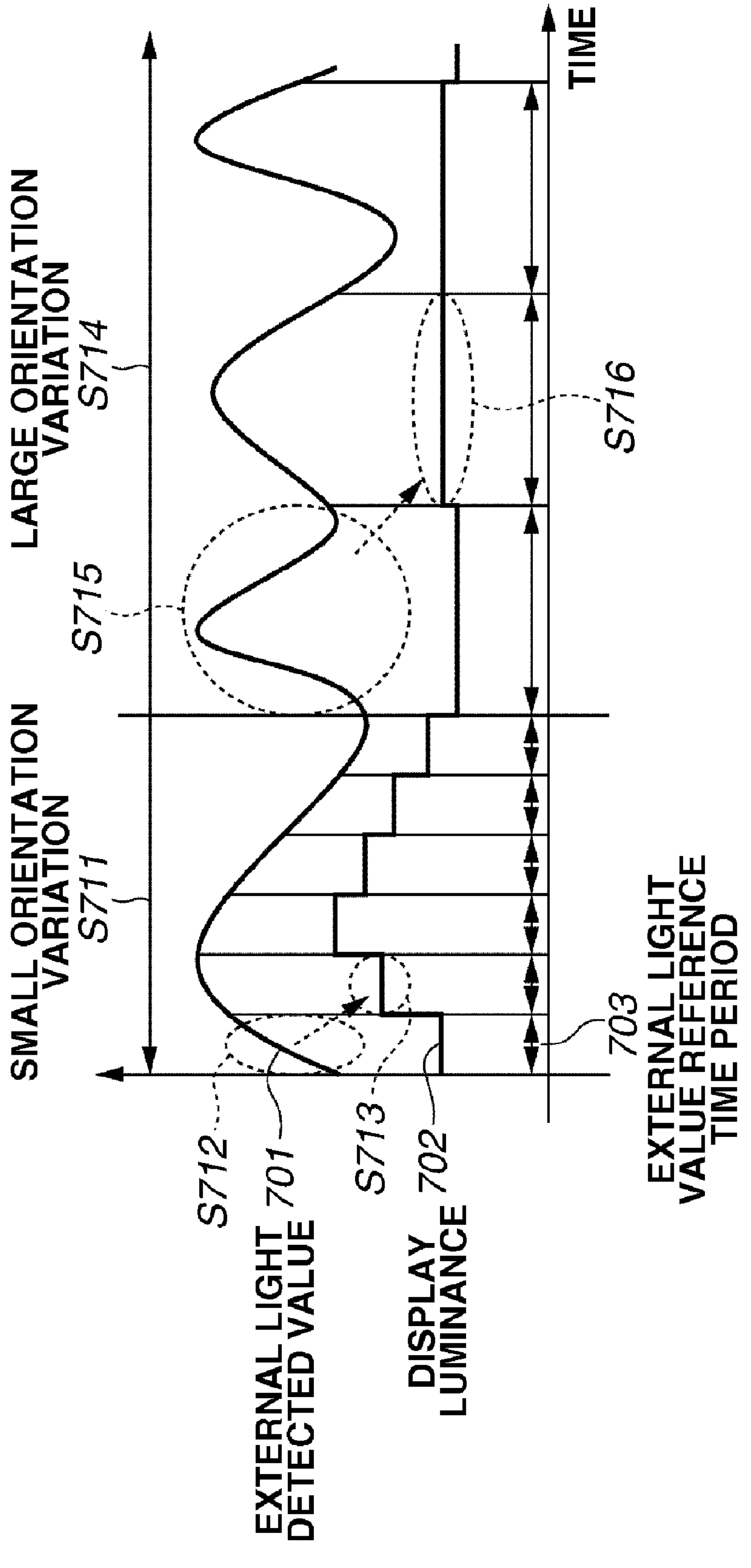
FIG. 7 is a schematic diagram illustrating a relationship among an orientation variation, an external light detected value, and a change in display luminance of a display apparatus according to the third exemplary embodiment.

FIG. 7 illustrates an example of a relationship among an orientation variation, an external light detected value, and a change in display luminance. Line 701 represents a detected value detected by the external light detection unit 15. Line 702 represents display luminance of the liquid crystal panel display unit 9 when an image is displayed. Line 703 represents an external light value reference time period to be measured in the timer control unit 6.

With respect to the flow of a change in display luminance, an example will be described below. In step S711, the orientation variation detected value is relatively small and the external light value reference time period 703 is set relatively short. In step S712, a mean value of external light values during the external light value reference time period 703, which is set relatively short, is calculated. In step S713, the system control unit 1 calculates a backlight luminance value suitable for an external light value by referring to a mean value of external light detected values in step S712 and subjects the backlight illumination 11 to light control.

Subsequently, during a time period in step S711, since the orientation variation is relatively small, the external light value reference time period 703 is relatively short. Thus, the backlight illumination 11 is subjected to relatively quick light control with respect to a change in external light detected value 701.

During a time period in step S714, the orientation variation detected value is relatively large and the external light value reference time period 703 is set relatively long in step S604 illustrated in FIG. 6. In step S715, the system control unit 1 calculates a mean value of external light values during the external light value reference time period 703, which is set relatively long. In step S716, the system control unit 1 refers to a mean value of external light detected values in step S715, calculates a suitable backlight luminance value with respect to an external light value, and subjects the backlight illumination 11 to light control. Subsequently, during a time period in step S714, even when the external light detected value 701 is relatively greatly changed, the external light detected value 701 is averaged with a relatively long external light value reference time period. Thus, a change in display luminance is gradual compared with that during a time period in step S711.

In the first and the second exemplary embodiments, except when it is determined that a display apparatus is stationary (the variation is equal to or less than a predetermined value), automatic light control of the display apparatus is inhibited. Hence, when display confirmation is performed while a portable display apparatus is being moved to a certain degree at the time of confirmation of a captured image with a quick review display of a digital camera, automatic light control is not executed. The present exemplary embodiment is configured such that as the orientation variation of a display apparatus is increased, a change in display luminance is reduced. Accordingly, even when display confirmation is performed while a display apparatus is being moved to a certain degree, suitably setting an external light value reference time period allows automatic light control to be executed. When the orientation of a display apparatus is greatly changed such that display confirmation is not performed, a change in display luminance due to automatic light control is slowed. Accordingly, a disadvantage of frequently changing brightness of a screen can be resolved.

As application of the configuration in the present exemplary embodiment, the present exemplary embodiment can include a combination with the first or the second exemplary embodiment. For example, the external light value reference time period 703 in FIG. 7 is changed according to the orientation variation of a display apparatus by the configuration in the present exemplary embodiment. When the orientation of the display apparatus is greatly changed such that display confirmation is not performed, the backlight illumination 11 is turned off by the configuration in the second exemplary embodiment. This allows not only an effect in the present exemplary embodiment but also an electric power saving effect in the second exemplary embodiment to be obtained.

A fourth exemplary embodiment of the present invention will be described. The configuration of the fourth exemplary embodiment is similar to FIG. 1 in the first exemplary embodiment.

Figure 8:
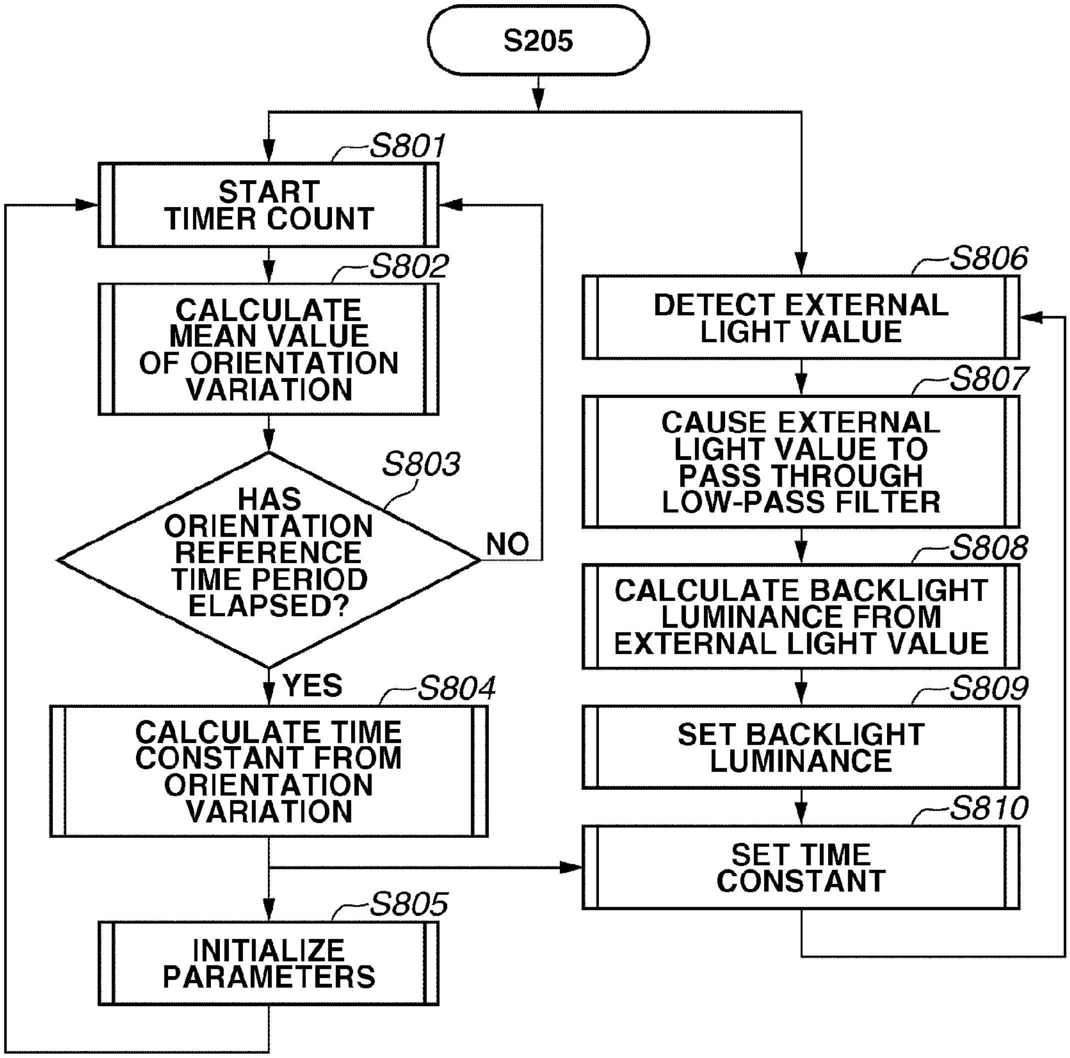
FIG. 8 is a flowchart illustrating automatic light control processing performed by a display unit according to a fourth exemplary embodiment of the present invention.

FIG. 8 a flowchart illustrating processing executed in the fourth exemplary embodiment. Since processing prior to step S801 in FIG. 8 is similar to processing before step S205 in FIG. 2, descriptions thereof are not repeated.

In step S801, the system control unit 1 causes the timer control unit 6 to start timer count 1. The timer control unit 6 measures an orientation variation reference time period. The orientation variation reference time period is a predetermined fixed value. In step S802, the orientation variation detection unit 16 detects an orientation variation of the display apparatus 17. The detection cycle of the orientation variation detection unit 16 is set shorter than the orientation variation reference time period. Further, the orientation variation detected value is an absolute value. The system control unit 1 transmits the orientation variation detected value to the calculation area of the RAM 13 and calculates a mean value of orientation variation detected values during the orientation variation reference time period.

In step S803, the system control unit 1 determines whether the orientation variation reference time period has elapsed in the timer control unit 6. If the orientation variation reference time period has elapsed (YES in step S803), the processing proceeds to step S804. If the orientation variation reference time period has not elapsed (NO in step S803), the processing proceeds to step S801. In step S804, the system control unit 1 changes a time constant of a low-pass filter set in step S807 based on a mean value of orientation variation detected values during the orientation variation reference time period calculated in step S802. The larger the orientation variation becomes, the larger the value of the time constant is set. In step S805, the system control unit 1 initializes parameters including a count value of the timer count 1 and the mean value of orientation variation detected values.

In step S806, the external light detection unit 15 detects an external light value. In step S807, the system control unit 1 causes an external light detected value obtained in step S806 to pass through a low-pass filter. If an input is given by x and an output is given by y, the low-pass filter can be represented by a difference equation such as formula (1) or (2).

$$y(n) = \frac{1}{N}\sum_{m=0}^{N} h_m x(n-m) \tag{1}$$

-continued $$y(n) = \sum_{k=1}^{N} a_k y(n-k) + \sum_{k=0}^{N} b_k x(n-k) \tag{2}$$

Formula (1) is a filter referred to as a finite impulse response (FIR) filter. When the value of a weighting parameter h is changed, a time constant of the filter can be changed. Further, formula (2) is referred to as an infinite impulse response (IIR) filter. When the values of weighting parameters a and b are changed, a time constant of the filter can be changed. The IIR filter can reduce the number of steps N compared with the FIR filter. However, the IIR filter has a disadvantage of allowing a system to be unsteadied. The system control unit 1 transmits an external light detected value obtained in step S806 to the calculation area of the RAM 13. The calculation area of the RAM 13 is capable of storing external light detected values in N steps. The system control unit 1 refers to these values and determines an external light value based on formula (1) or (2).

In step S808, the system control unit 1 refers to an external light value calculated in step S807 and calculates a backlight luminance value suitable for an external light value. In step S809, the system control unit 1 executes setting of the backlight luminance value calculated in step S808 and subjects the backlight illumination 11 to light control. In step S810, the system control unit 1 changes the weighting parameter h or the weighting parameters a and b of the low-pass filter in step S807 to provide a time constant calculated in step S804.

Figure 9:
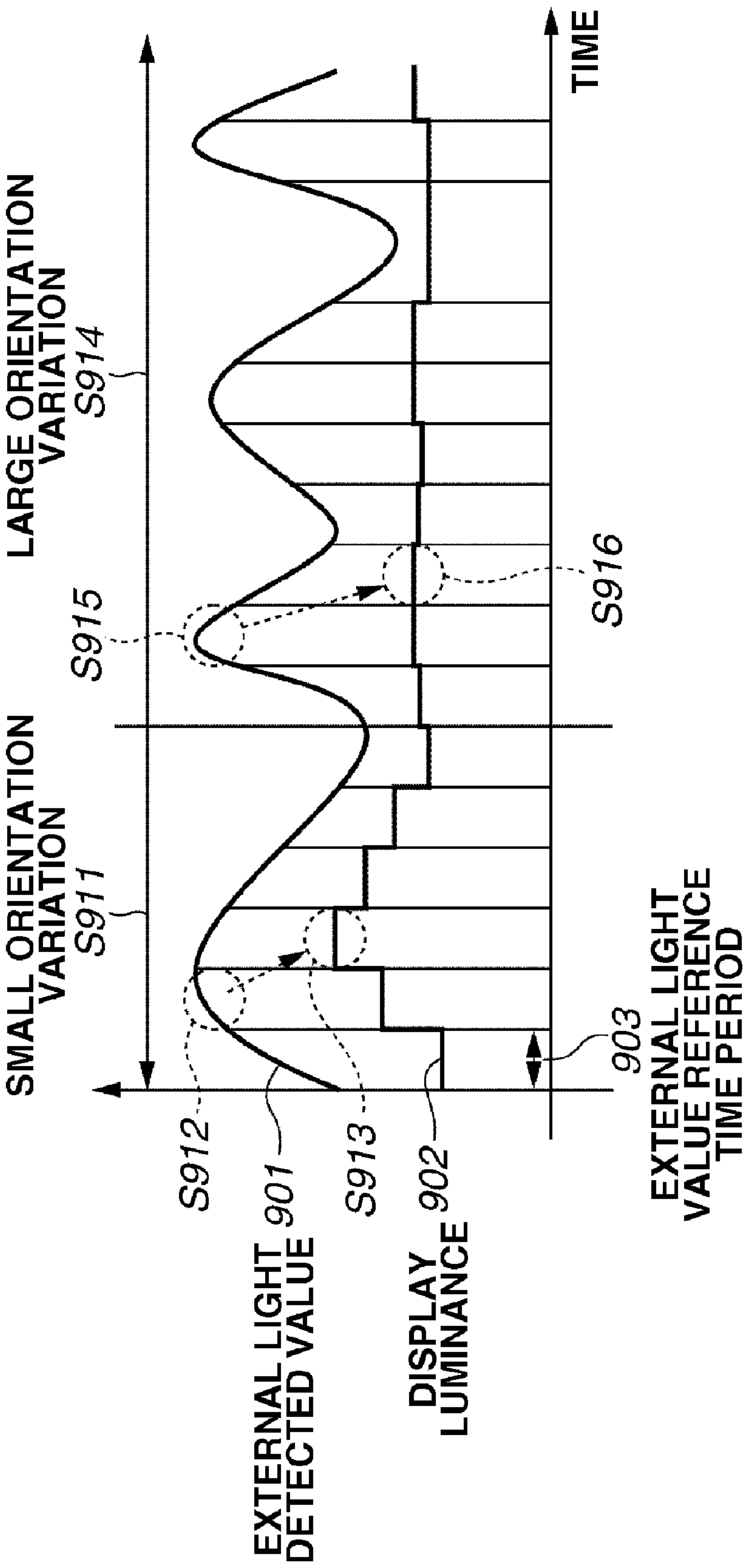
FIG. 9 is a schematic diagram illustrating a relationship among an orientation variation, an external light detected value, and a change in display luminance of a display apparatus according to the fourth exemplary embodiment.

FIG. 9 illustrates an example of a relationship among an orientation variation, an external light detected value, and a change in display luminance. Line 901 represents a detected value detected by the external light detection unit 15. Line 902 represents display luminance of the liquid crystal panel display unit 9 when an image is displayed. Line 903 represents an orientation variation reference time period to be measured by the timer control unit 6.

With respect to the flow of a change in display luminance, an example will be described below. In step S911, the orientation variation detected value is relatively small and the time constant is relatively small. In step S912, an external light value is obtained which has passed through a low-pass filter with a time constant relatively set small. In step S913, the system control unit 1 refers to an external light value in step S912, calculates a backlight luminance value suitable for an external light value, and subjects the backlight illumination 11 to light control. Subsequently, since the orientation variation is relatively small during a time period in step S911, the time constant of the low-pass filter is set small. Thus, the backlight illumination 11 is subjected to relatively high sensitive light control with respect to a change in external light detected value 901.

During a time period in step S914, the orientation variation detected value is set relatively large and the time constant of the low-pass filter is set relatively large. In step S915, an external light value is obtained which has passed through a low-pass filter with a time constant relatively set large. In step S916, the system control unit 1 refers to an external light value in step S915, calculates a backlight luminance value suitable for an external light value, and subjects the backlight illumination 11 to light control. Subsequently, during a time period in step S914, even when the external light detected value 901 is relatively greatly changed, since the time constant of the low-pass filter is large and a response of a high frequency component is removed, a change in display luminance is slowed compared with that during a time period in step S911.

Similar to the third exemplary embodiment, the present exemplary embodiment is configured such that the larger the orientation variation of a display apparatus becomes, the more a change in display luminance is reduced. Accordingly, even when display confirmation is performed while the display apparatus is being moved to a certain degree such as that at the time of quick review in a digital camera, suitably setting a time constant of a low-pass filter allows automatic light control to be executed. When the orientation of the display apparatus is greatly changed such that display confirmation is not performed, a change in display luminance due to automatic light control is slowed. Accordingly, a disadvantage of frequently changing brightness of a screen can be resolved.

In the third exemplary embodiment, the larger the orientation variation of the display apparatus, the longer a time until display luminance changes. Thus, display luminance tends to change in a step-like manner. Generally, a user is hardly affected by flicker of a screen when a change in luminance is continuous. In the present exemplary embodiment, even when the orientation variation of the display apparatus is changed, timing of a change in display luminance is constant. Thus, display luminance is changed relatively continuously. For this reason, the present exemplary embodiment is configured to reduce flicker due to a change in display luminance.

The present exemplary embodiment can also include a combination with the first or the second exemplary embodiment. For example, when the orientation of the display apparatus is greatly changed such that display confirmation is not performed, the backlight illumination 11 is turned off by the configuration in the second exemplary embodiment. This allows not only an effect in the present exemplary embodiment but also an electric power saving effect in the second exemplary embodiment to be obtained.

In the descriptions of the above-described first to four exemplary embodiments, the orientation variation detection unit 16 includes a sensor capable of detecting an orientation variation per unit time, such as an angular acceleration sensor, an acceleration sensor, or a gyro sensor, and a detection circuit. However, in the case of a display apparatus having a moving image capture function, such as a digital camera or a video camera, the orientation variation detection unit 16 can be configured to detect an orientation variation of a display apparatus based on a captured image.

Figure 10:
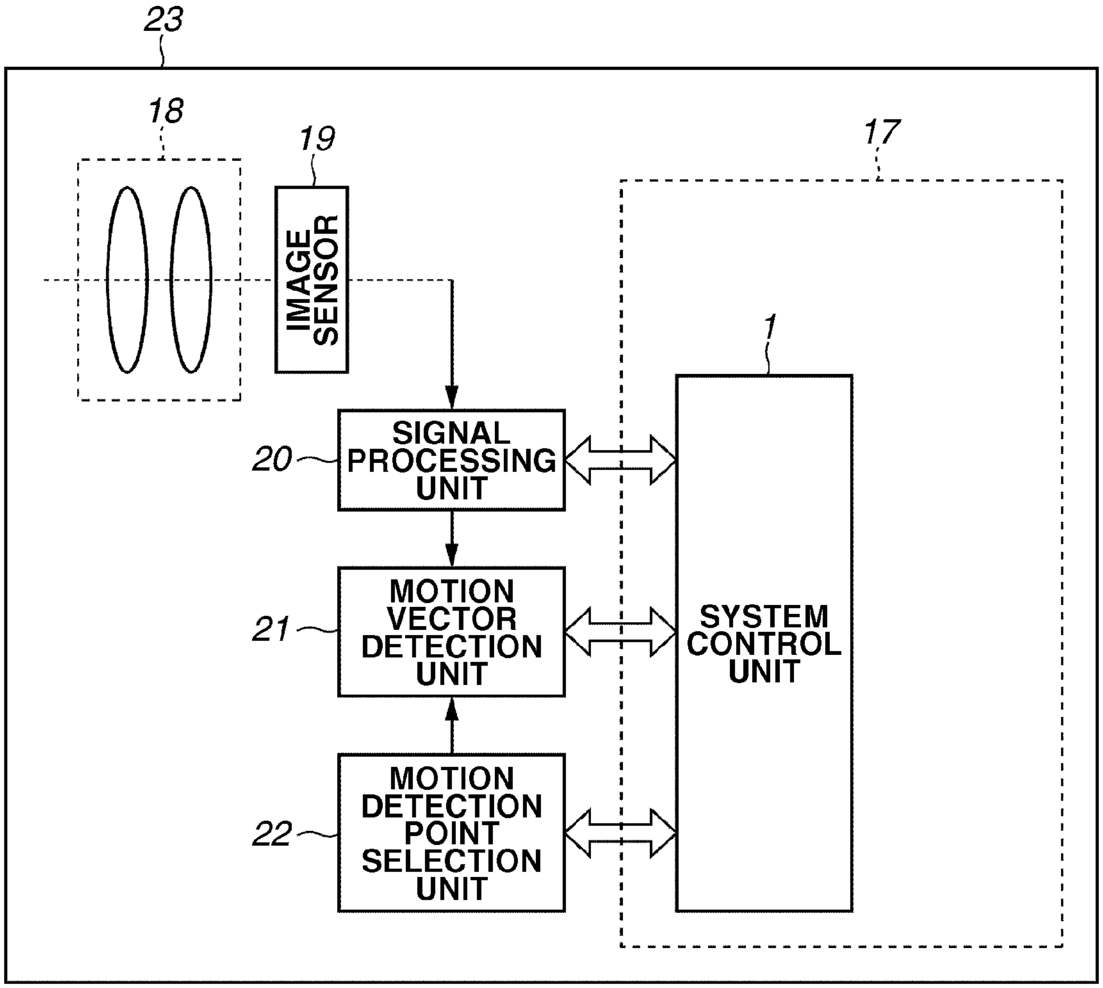
FIG. 10 is a block diagram illustrating a configuration of a display apparatus with an imaging function according to a fifth exemplary embodiment of the present invention, which can detect an orientation variation of the display apparatus.

This will be described below as a fifth exemplary embodiment of the present invention. FIG. 10 illustrates a block diagram of a portable display apparatus having an image capture function according to the present exemplary embodiment. The portable display apparatus is configured to provide the display apparatus 17 in FIG. 1 with an imaging system. A display apparatus 23 with an image capture function capable of capturing a moving image, such as a digital camera or a video camera, is equipped with an imaging system to execute moving image capture.

The imaging system includes an imaging optical system 18, an image sensor 19, such as a charge coupled device (CCD) sensor or a complementary metal oxide semiconductor (CMOS) sensor, a signal processing unit 20, which processes a signal from the image sensor 19 to generate a video signal.

A motion vector detection unit 21 detects a local motion vector between frame images which include input moving image data. A motion detection point selection unit 22 designates the coordinates of a detection point, on which motion detection is to be performed. The detection point can be any of a pixel unit and a small area unit including a plurality of pixels. The position and arrangement of the detection point can be arbitrarily set. In the present exemplary embodiment, small areas of four corners of a frame image are selected.

The motion vector detection unit 21 executes block matching in the coordinates designated by the motion detection point selection unit 22 and calculates a motion vector at each detection point. Detection of a motion vector by block matching is executed with the following procedure.

Procedure 1: The motion vector detection unit 21 determines the sum total of differences in luminance of each corresponding pixel, the second power sum of differences in luminance, normalized cross-correlation, and others between a reference block (a rectangular area centering on a target point in the k-th frame) and a certain candidate block (a rectangular area in the (k+1)th frame).

Procedure 2: The motion vector detection unit 21 repeats procedure 1 while moving a candidate block within a search area.

Procedure 3: The motion vector detection unit 21 determines a candidate block which gives a minimum value when the sum total or the second power sum of differences in luminance is used, and a maximum value when normalized cross-correlation is used in a search area.

As a result of block matching, if motion vectors at four corners in a frame image are directed in the same direction, it can be presumed that the orientation of the display apparatus has been changed. An orientation variation can be detected based on the size of the motion vector.

As described above, the present exemplary embodiment is configured to detect an orientation variation of a display apparatus based on a captured image. Thus, a similar effect to the first to fourth exemplary embodiments can be obtained.

In the descriptions of the above-described exemplary embodiments, the present invention is configured to assume a liquid crystal display type display apparatus which uses backlight illumination. However, the present invention can also be applied to a configuration using a self-activated luminescence type display, such as an organic electroluminescence display (organic EL display), a field emission display (FED), or the like.

Figure 11A:
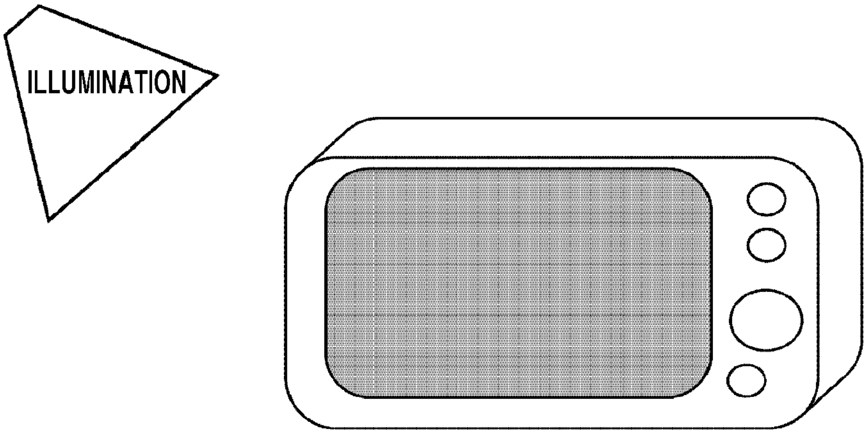
FIGS. 11A to 11C are views illustrating changes in orientation of a portable display apparatus relative to illumination.
Figure 11B:
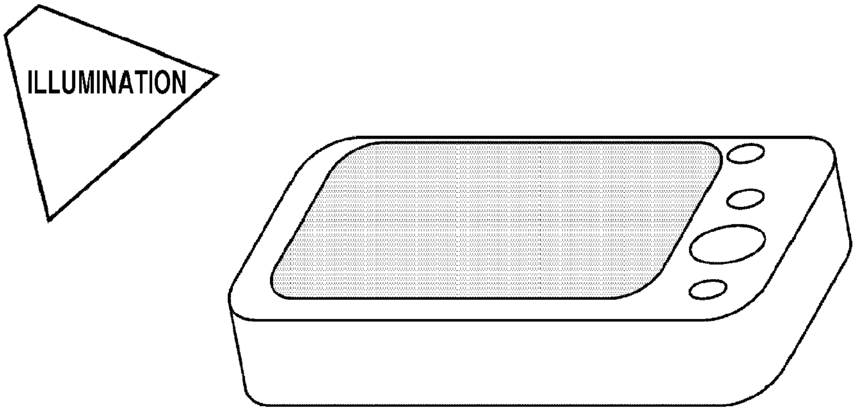
Figure 11C:
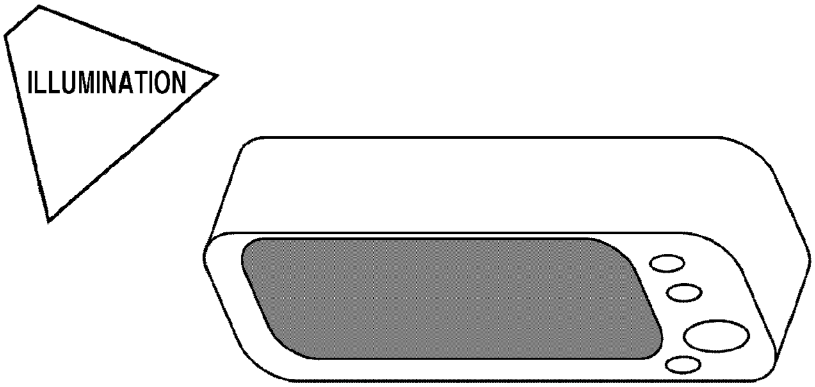

In the above-described exemplary embodiments, an external light detection unit is provided in the same direction as a screen of a display apparatus. In this case, as illustrated in FIGS. 11A to 11C, a display screen indicates a characteristic of increased luminance when illumination is in the same direction as a display direction and decreased luminance when illumination is in the opposite direction to a display direction. Accordingly, the system control unit 1 executes control in the above-described exemplary embodiments when the orientation variation detection unit 16 indicates an orientation change in a vertical direction as illustrated in FIGS. 11A to 11C or, similarly, indicates an orientation change in a horizontal direction.

When it is not the vertical and horizontal orientation change, but an orientation change in which a display screen is only rotated around the center thereof, for example in FIGS. 11A to 11C, since a relative position between a screen direction and an illumination direction is not changed, adjustment corresponding to the above-described orientation may not be performed or only relatively small adjustment may be performed.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-151819 filed Jun. 10, 2008, which is hereby incorporated by reference herein in its entirety.

What is claimed is:

1. A display control apparatus comprising:

an external light detection unit configured to detect ambient brightness of a display apparatus;

a variation detection unit configured to detect a variation speed of orientation of the display apparatus, wherein the variation speed is a variation value of orientation of the display apparatus per unit time;

a control unit configured to adjust display luminance of the display apparatus according to the ambient brightness detected by the external light detection unit and the variation speed detected by the variation detection unit; and a time measurement unit configured to measure a reference time period, wherein the control unit adjusts the display luminance based on values detected by the external light detection unit during the reference time period, and wherein the larger the variation speed of orientation is detected by the variation detection unit, the longer the reference time period is measured by the time measurement unit.

2. A display control apparatus comprising:

an external light detection unit configured to detect ambient brightness of a display apparatus;

a variation detection unit configured to detect a variation speed of orientation of the display apparatus, wherein the variation speed is a variation value of orientation of the display apparatus per unit time;

a control unit configured to adjust display luminance of the display apparatus according to the ambient brightness detected by the external light detection unit and the variation speed detected by the variation detection unit; and a time measurement unit configured to measure a reference time period, wherein the control unit adjusts the display luminance based on values detected by the external light detection unit and passed through a low-pass filter during the reference time period, wherein the control unit varies a time constant of the low-pass filter according to the variation speed of orientation detected by the variation detection unit, and wherein the larger the variation speed of orientation is detected by the variation detection unit, the larger the time constant of the low-pass filter is varied by the control unit.

3. A display control method comprising:

detecting ambient brightness of a display apparatus by an external light detection unit;

detecting a variation speed of orientation of the display apparatus by a variation detection unit, wherein the variation speed is a variation value of orientation of the display apparatus per unit time;

adjusting display luminance of the display apparatus by a control unit according to the detected ambient brightness and the detected variation speed, and measuring a reference time period by a time measurement unit, wherein the display luminance is adjusted by the control unit based on values detected by the external light detection unit during the reference time period, and wherein the larger the variation speed of orientation is detected by the variation detection unit, the longer the reference time period is measured by the time measurement unit.

4. A display control method comprising:

detecting ambient brightness of a display apparatus by an external light detection unit;

detecting a variation speed of orientation of the display apparatus by a variation detection unit, wherein the variation speed is a variation value of orientation of the display apparatus per unit time;

adjusting display luminance of the display apparatus by a control unit according to the detected ambient brightness and the detected variation speed, and measuring a reference time period by a time measurement unit, wherein the display luminance is adjusted based on values detected by the external light detection unit and passed through a low-pass filter during the reference time period, and wherein the control unit varies a time constant of the low-pass filter according to the variation speed of orientation detected by the variation detection unit, and wherein the larger the variation speed of orientation is detected by the variation detection unit, the larger the time constant of the low-pass filter is varied by the control unit.

* * * * *